United States Patent [19]

Nonoyama

[11] Patent Number: 5,068,747
[45] Date of Patent: Nov. 26, 1991

[54] IMAGE READING APPARATUS

[75] Inventor: Makoto Nonoyama, Kanagawa, Japan

[73] Assignee: Kabushiki Kaisha Toshiba, Kanagawa, Japan

[21] Appl. No.: 462,980

[22] Filed: Jan. 10, 1990

Related U.S. Application Data

[63] Continuation of Ser. No. 151,489, Feb. 2, 1988, abandoned.

[30] Foreign Application Priority Data

Feb. 3, 1987 [JP] Japan .............................. 62-022943

[51] Int. Cl.$^5$ ............................................. H04N 1/40
[52] U.S. Cl. .................................... 358/448; 358/453
[58] Field of Search .............. 358/400, 401, 413, 450, 358/453, 460, 448, 494, 496, 497

[56] References Cited

U.S. PATENT DOCUMENTS

| | | | |
|---|---|---|---|
| 4,134,135 | 1/1979 | Inokuchi | 358/280 |
| 4,326,217 | 4/1982 | Iwasawa | 358/280 |
| 4,414,579 | 11/1983 | Dattilo | 358/286 |
| 4,562,485 | 12/1985 | Maeshima | 358/280 |
| 4,591,922 | 5/1986 | Takano | 358/280 |
| 4,598,323 | 7/1986 | Honjo | 358/285 |
| 4,679,155 | 7/1987 | Mitsuka | 358/450 |
| 4,701,804 | 10/1987 | Toyoda | 358/285 |
| 4,754,338 | 6/1988 | Hideshima | 358/494 |
| 4,807,044 | 2/1989 | Kikuchi et al. | 358/448 |

Primary Examiner—Edward L. Coles, Sr.
Assistant Examiner—Jerome Grant, II
Attorney, Agent, or Firm—Finnegan, Henderson, Farabow, Garrett, and Dunner

[57] ABSTRACT

An image reading apparatus for repeatedly reading an image of a fixed manuscript by reading the fixed manuscript line-by-line in a first direction and scanning in a second direction each line of the fixed manuscript. The image reading apparatus also repeatedly reads an image of a moving manuscript. The moving manuscript is transferred from a manuscript supplying section also in the first direction and each line of the moving manuscript is also scanned in the second direction. The image information read by the scanning of the moving manuscript in the second direction is memorized in the sequential read order and then is read-out in an order opposite to that of the sequential read order. The image information read by scanning the fixed manuscript in the second direction may be memorized in the sequential read order. If so, the image information read by the scanning of the moving manuscript in the second direction is memorized in an order opposite to the sequential read order and then is read out in the sequential read order the same as the order of the image information of the fixed manscript.

6 Claims, 9 Drawing Sheets

EVEN LINE
ODD LINE

FIG.8B

ADF READING TIME

IMAGE READING APPARATUS

This application is a continuation of application Ser. No. 07/151,489, filed Feb. 2, 1988 now abandoned 1/10/90.

The present invention relates to an image reading apparatus which can read an image of a fixed manuscript placed on a stationary placing portion, and can read an image of a moved manuscript transferred and supplied from a manuscript supplying section.

BACKGROUND OF THE INVENTION

Figure 1:
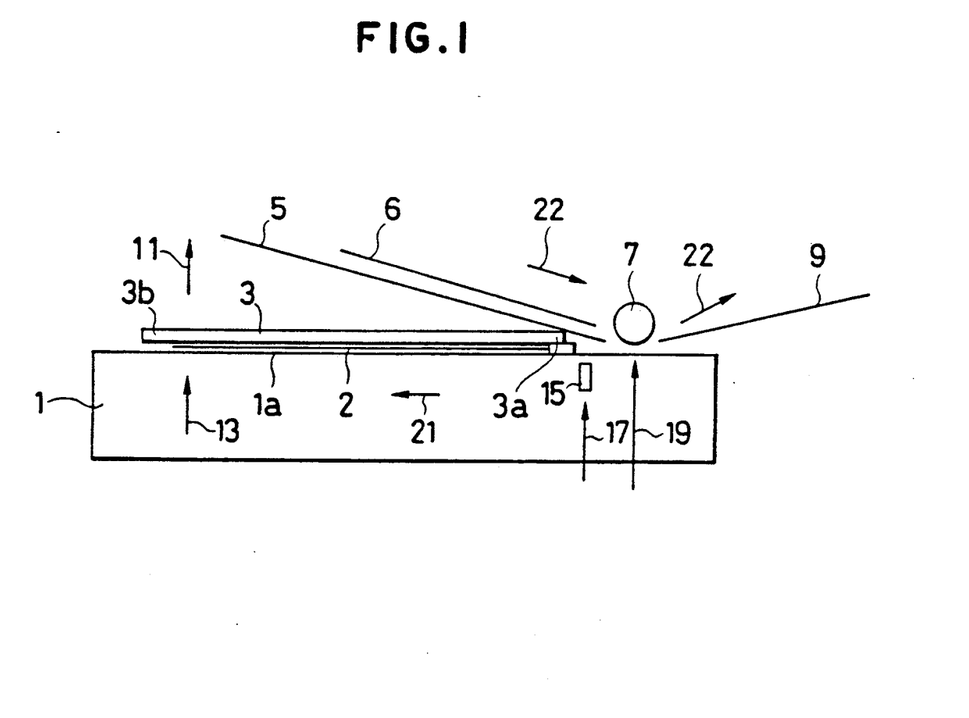
FIG. 1 is a side view of a conventional image reading apparatus.

In a conventional image reading apparatus of this type, as shown in FIG. 1, for example, a flat upper surface 1a an apparatus body 1 is disposed as a manuscript placing portion for placing a fixed manuscript thereon, and the fixed manuscript is covered and pressed by a platen cover 3. A moved manuscript supplying tray 5 for a moved manuscript is slantingly disposed above the platen cover 3. One end of the moved manuscript supplying tray 5 extends towards a platen roller 7 for the moved manuscript disposed in the vicinity of one end of the apparatus body 1. A moved manuscript receiving tray 9 is disposed on the opposite side of the platen roller 7 to receive the moved manuscript. The platen cover 3 for pressing the fixed manuscript is attached to the apparatus body 1 through a hinge, etc., at one end 3a thereof in proximity to the platen roller 7. The other end 3b of the platen cover 3 is lifted above as shown by arrow 11 of FIG. 1 to place the fixed manuscript 2 on the manuscript placing portion 1a between the platen cover 3 and the apparatus body 1.

As shown by arrow 13 of FIG. 1, a reference position for reading the fixed manuscript is located at the other end of the platen cover 3 when an image of the fixed manuscript 2 placed on the manuscript placing portion 1a is read. The image of the fixed manuscript 2 placed on the manuscript placing portion 1a read by moving a reading section 15 constituted by a CCD image sensor, etc., disposed within the apparatus body just below the manuscript placing portion 1a from a home position 17 to an end portion of the manuscript placing portion 1a in a first direction shown by arrow 21.

A moved manuscript 6 placed on the manuscript supplying tray 5 is moved by the rotation of unillustrated rollers and the platen roller 7 in a second direction shown by arrow 22, and passes on the lower side of the platen roller 7, and is then discharged to the manuscript receiving tray 9. The image of the moved manuscript 6 moved on the lower side of the platen roller 7 is read by moving and fixing the reading section 15 in a reading position shown by arrow 19 below the platen roller 7, and by moving the moved manuscript 6 on the lower side of the platen roller 7 in the second direction 22 as mentioned above with respect to the reading section 15 fixed in the reading position 19. Such a reading operation of the moved manuscript is called ADF reading operation, and the reading position 19 is called ADF reading position in the following description.

As mentioned above, in the image reading apparatus for performing both the fixed manuscript reading operation and the ADF reading operation, the moved manuscript supplying tray 5 for supplying the moved manuscript is disposed above the fixed manuscript placing portion 1a, and the reading section 15 and the moved manuscript 6 are respectively moved in the first and second directions 21 and 22. Accordingly, the fixed and moved manuscripts 2 and 6 and the reading section 15 can be relatively moved in the same direction, thereby using the same circuit for processing the read image information from the reading section 15.

In the conventional image reading apparatus mentioned above, the moved manuscript supplying tray 5 is disposed above the fixed manuscript placing portion 1a, so that the platen cover 3 cannot be easily moved and sufficiently opened since the platen cover 3 hits the moved manuscript supplying tray 5 when the platen cover 3 for the fixed manuscript is opened upwards, thereby making the appearance worse and reducing the function. Further, the conventional apparatus has the disadvantages in that the ADF reading position is spaced apart from the reference position for reading the fixed manuscript.

SUMMARY OF THE INVENTION

To overcome the problems mentioned above, an object of the present invention is to provide an image reading apparatus for improving operability and having functional appearance and reducing cost and performing both fixed image reading and ADF reading operations.

With the above object in view, the present invention resides in an image reading apparatus comprising means for reading an image of a fixed manuscript placed on a fixed manuscript placing portion by scanning the fixed manuscript in a first direction and moving a moved manuscript supplied from a manuscript supplying section in a second direction perpendicular to the first direction, said means reading an image of the moved manuscript by scanning the moved manuscript in the first direction. The apparatus further comprises inverting means for inverting with respect to the first direction the image information read by the reading means by scanning the moved manuscript in the first direction.

In the image reading apparatus of the present invention, the moved direction of the reading means with respect to the fixed manuscript is equal to the direction in which the moved manuscript is transferred. Both manuscripts are scanned and read in the first direction. When the moved manuscript is read, the image information read by scanning the moved manuscript by the reading means in the first direction is inverted with respect to the first direction.

BRIEF DESCRIPTION OF THE DRAWINGS

The present invention will be more apparent from the preferred embodiments thereof in conjunction with the accompanying drawings in which.

DETAILED DESCRIPTION OF THE PREFERRED EMBODIMENTS

The preferred embodiments of the present invention will now be described with reference to the accompanying drawings.

Figure 2:
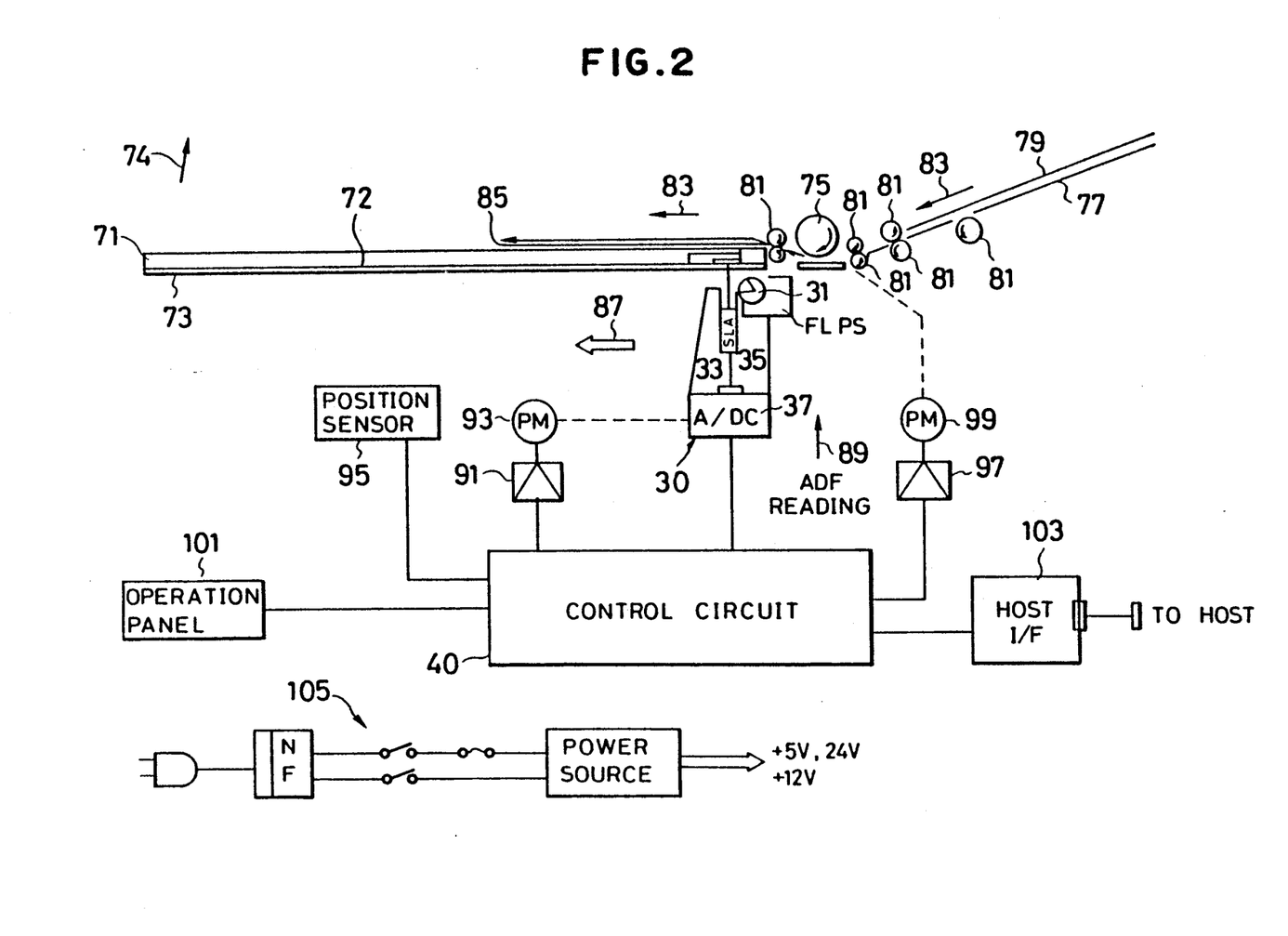
FIG. 2 is a view showing the whole construction of the image reading apparatus in accordance with one embodiment of the present invention.

FIG. 2 shows the whole construction of the image reading apparatus in one embodiment of the present invention. The image reading apparatus of the present invention can be applied to an image reading portion in an information filing apparatus for reading and filing an image of a manuscript, for example, a copying machine for copying an image, a facsimile apparatus for transmitting and receiving the image, etc. The image reading apparatus of the present invention can also perform both the operation for fixing a manuscript and reading the fixed manuscript, and the reading operation for reading a moved manuscript while the moved manuscript is transferred, i.e., ADF reading operation.

In the image reading apparatus shown in FIG. 2, a manuscript base glass 73 is disposed in an upper portion of the apparatus body, and a manuscript 72 is placed and fixed onto the manuscript base glass 73. The manuscript base glass 73 constitutes a placing portion for placing the fixed manuscript thereon. A platen cover 71 for pressing the fixed manuscript 72 from above is disposed on the fixed manuscript placing portion 73. The platen cover 71 is attached at one end thereof to one end of the fixed manuscript placing portion 73 by a hinge, etc., and can be opened at the other end around the one end of the platen cover upwards as shown by arrow 74. Thus, the fixed manuscript 72 can be inserted and fixed between the fixed manuscript placing portion 73 and the platen cover 71.

A platen roller 75 is disposed in proximity to one end of the platen cover 71, and a moved manuscript supplying tray 77 for placing a moved manuscript 79 thereon is disposed on the opposite side of the platen roller 75. A plurality of rollers 81 are disposed between the platen roller 75 and the moved manuscript supplying tray 77, and between the paten roller 75 and the platen cover 71. These rollers 81 transfer the moved manuscript 79 on the supplying tray 77 one by one to an upper portion of the platen cover 71 through the lower side of the platen roller 75 in a first direction shown by arrow 83. The rollers 81 comprise separating rollers for separating and transferring a plurality of moved manuscripts 79 placed and stacked on the supplying tray 77 one by one so as not to be simultaneously transferred together with each other.

The moved manuscript 79 is transferred by the plurality of rollers 81 from the supplying tray 77 through the lower side of the platen roller 75, and is then transferred and stacked onto an upper portion of the platen cover 71 which is also used for a receiving tray 85 for receiving each moved manuscript.

An image reading section 30 is disposed below the manuscript base glass 73, and can be moved below the manuscript glass 73 in the first direction as shown in arrow 87 to read the image of the fixed manuscript 72 placed on the placing portion 73. The image reading section 30 can be moved to an ADF reading position 89 shown by arrow 89 below the platen roller 75 so as to read the image of the moved manuscript 79, and is stopped in the ADF reading position 89 and reads the image of the moved manuscript 79 transferred to the first direction 83 on the lower side of the platen roller 75.

The image reading section 30 comprises a fluorescent lamp 31 for illuminating the manuscripts 72 and 79 from below, a CCD image sensor device 33 for optically reading the image of each manuscript, a small lens array 35 constituting an optical system for forming the image of the manuscript on the CCD image sensor device 33, and a pre-processing circuit 37 for clamping an image signal detected by the CCD image sensor device 33 and converting it to a digital signal. The image data converted to the digital signal by the pre-processing circuit 37 are supplied to a control circuit 40.

The control circuit 40 is connected to a pulse motor 93 for moving the reading section through a power amplifier 91, and is directly connected to a position sensor 95. The pulse motor 93 controls the movement of the image reading section 30 in the first direction 87, and the position sensor 95 detects the moved position of the image reading section 30. The control circuit 40 is also connected through a power amplifier 97 to a pulse motor 99 for rotating the rollers 81 to control the transfer of the moved manuscript 79 in the first direction 83.

The control circuit 40 is connected to an operation panel 101 and a host interface 103. The operation panel 101 has operating buttons for instructing respective various operations of the present image reading apparatus and indicators for indicating operating states of the apparatus, etc. The host interface 103 comprises an interface section for supplying image data read by the image reading apparatus and image-processed and finally converted to binary paralleled data to a host device such as a body of an information filing device. Further, the image reading apparatus has a power source 105 for supplying respective predetermined various voltages to analog circuits and digital circuits.

Figure 3A:
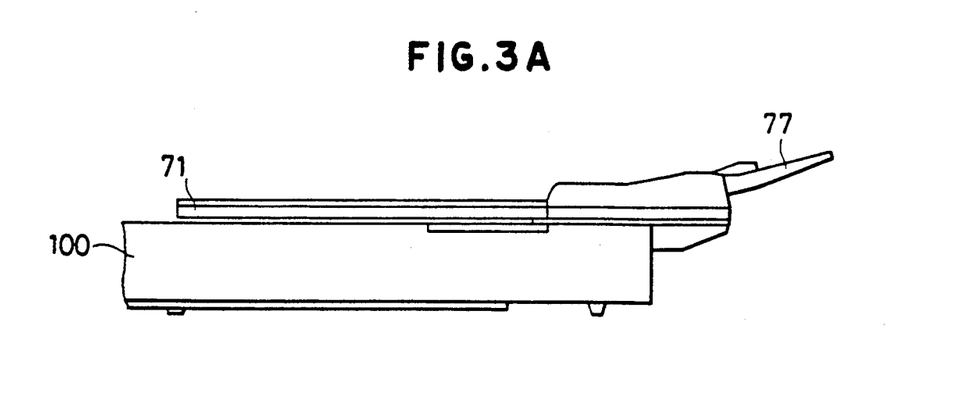
FIGS. 3A and 3B are side and plan views showing the appearance of the image reading apparatus of FIG. 2.
Figure 3B:
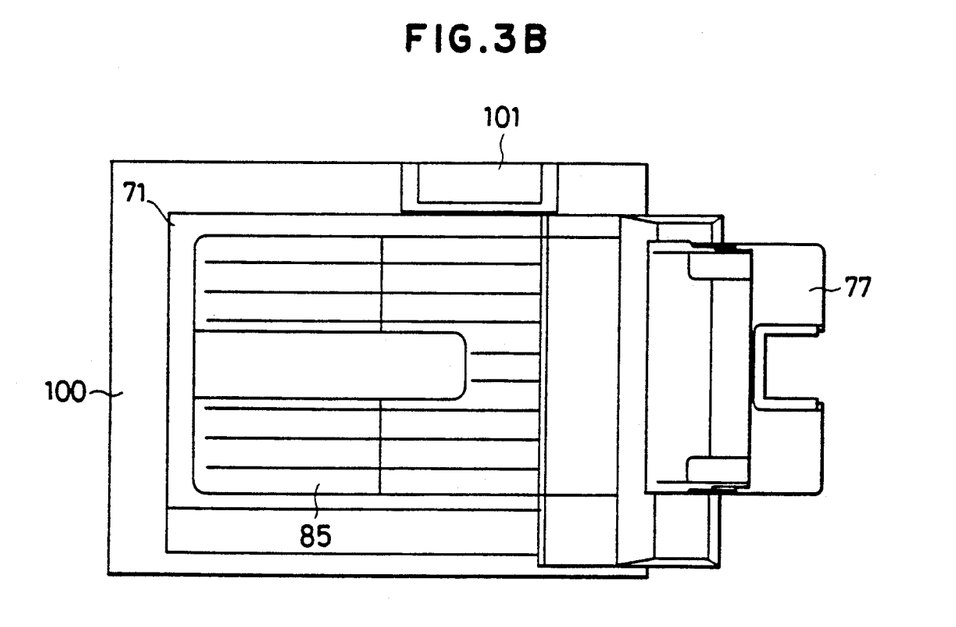

FIGS. 3A and 3B are a side view and a plan view showing the appearance of the image reading apparatus of FIG. 2. The body 100 of the image reading apparatus is connected to the platen cover 71, the manuscript base glass 73, the moved manuscript supplying tray 77, and the moved manuscript receiving tray 85, as described in relation to FIG. 2. The upper surface of the platen cover 71 is also used as the moved manuscript receiving tray 85. An operation panel 101 is disposed in an upper portion of the apparatus body 100 on a side of the moved manuscript receiving tray 85.

Figure 4:
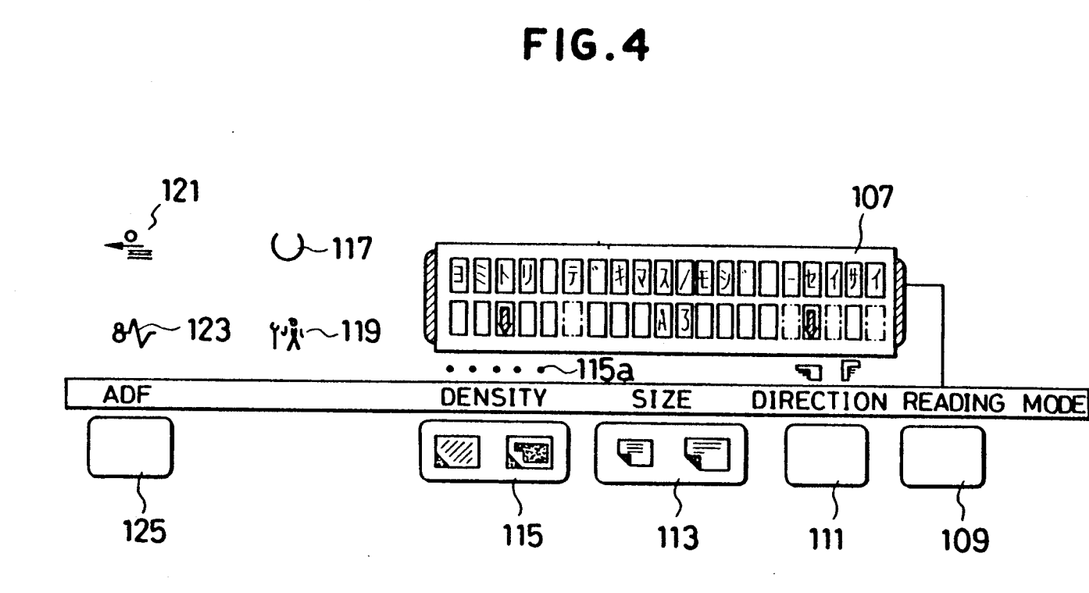
FIG. 4 is a view showing the construction of an operation panel of the image reading apparatus of FIG. 2.

As shown in FIG. 4, the operation panel 101 comprises a liquid crystal displaying section 107 for displaying the operating states of the image reading apparatus and various instructing information supplied to the apparatus, etc, a reading mode designating button 109 for designating manuscript reading modes such as character common mode, character fine mode and a photograph teaser mode, and a manuscript direction designating button 111 for designating whether the manuscript is read in the longitudinal or transversal direction. The operation panel 101 further comprises a manuscript size designating button 113 for designating the size of the manuscript to be read such as A5, A4, A3, B5 and B4, and displaying the size of the designated manuscript in the liquid crystal displaying section 107, a manuscript density designating button 115 for designating the density of the manuscript to be read, and a manuscript density light emitting diode 115a for displaying the density designated by the manuscript density designating button 115. The operation panel 101 further comprises a light emitting diode 117 indicating the completion of the preparation of the reading operation and turned on when the image reading apparatus is in a state in which the apparatus can perform the reading operation, a light emitting diode 119 turned on when the image reading apparatus is abnormal in operation and displaying the abnormal state in the liquid crystal displaying section 107, and a light emitting diode 121 turned on in the moved manuscript reading mode, i.e., ADF mode and displaying this ADF mode. The operation panel 101 further comprises a light emitting diode 123 turned on when the moved manuscript is jammed in the ADF mode and displaying this jammed state, and a mode change-over button 125 for change over the ADF mode and the fixed manuscript reading mode.

Figure 5:
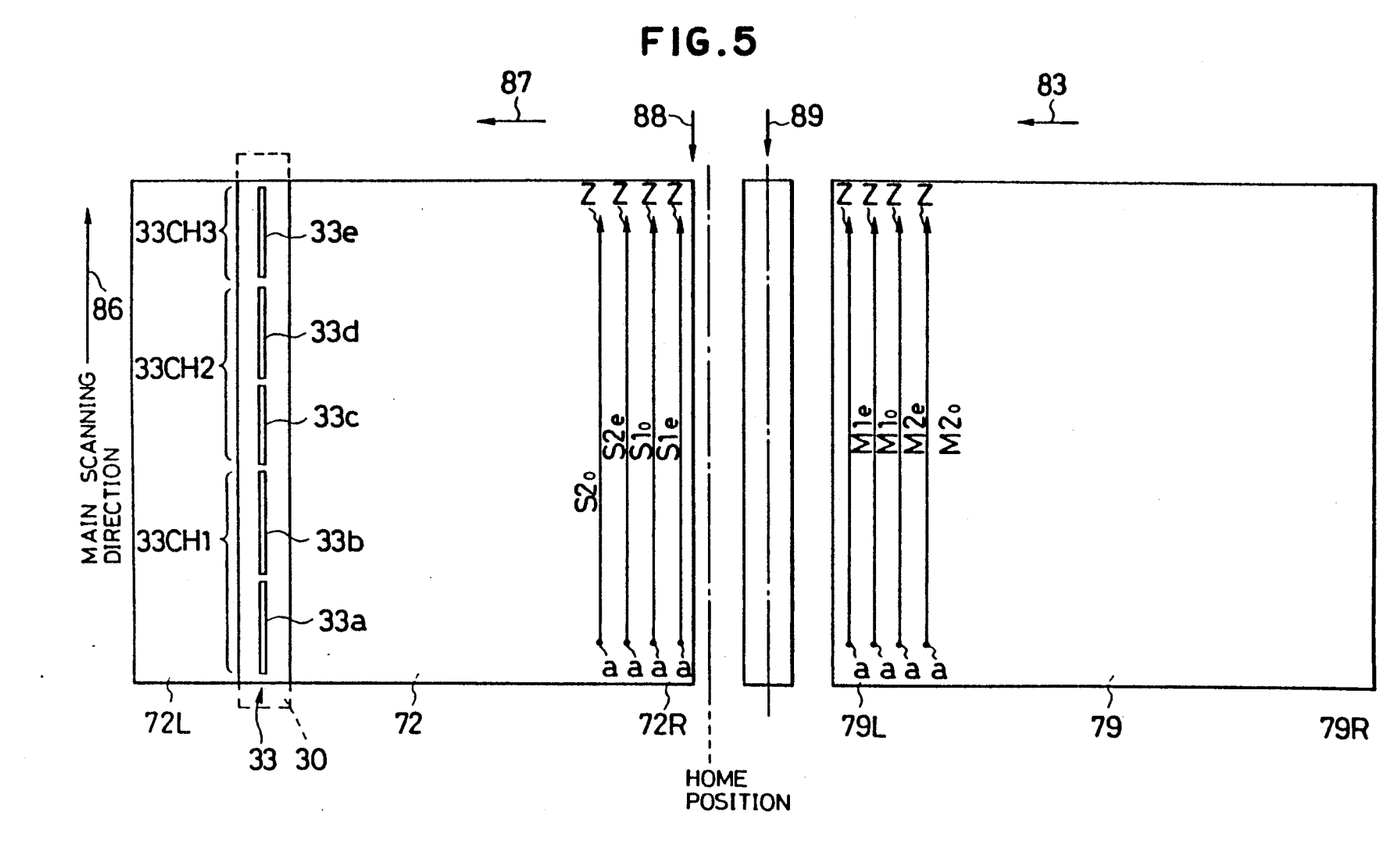
FIG. 5 is a view explaining the image reading operation with respect to fixed and moved manuscripts in the image reading apparatus of FIG. 2.

FIG. 5 is a view for explaining the relation of the reading scanning operation with respect to the image reading section 30, the respective fixed and moved manuscripts 72 and 79 when the fixed and moved manuscripts 72 and 79 are read. The image reading section 30 reads an image of the fixed manuscript 72 while the image reading section 30 is moved in a first direction 87, i.e., a secondary scanning direction from a starting position 88 for reading the fixed manuscript. In the case of the moved manuscript 79, the image reading apparatus 30 is stopped in ADF reading position 89 and reads an image of the moved manuscript 79 moved in the secondary scanning direction which is the first direction 83. In FIG. 5, the image reading section 30 is shown in a state in which the image reading section 30 is moved at the left end 72L of the fixed manuscript 72. The image reading section 30 is constituted by the CCD image sensor device 33 mentioned above and composed of a plurality of CCD image sensor units such as five units 33a to 33e disposed in the widthwise direction of the manuscripts 72 and 79 at full width thereof to optically read the images of the manuscripts 72 and 79. More specifically, the image reading section 30 is moved relative to the respective manuscripts as mentioned above, and the respective manuscripts 72 and 79 are optically scanned by the CCD image sensor device 33 in a main scanning direction shown by arrow 86 and perpendicular to secondary scanning directions 87 and 83 to read the images of the manuscripts. In this case, to perform the optically reading scanning operation in the main scanning direction 86 at a high speed, the first to fifth CCD image sensor units 33a to 33e are mainly divided into a first channel image sensor section 33CH1 composed of the first and second CCD image sensor units 33a and 33b, a second channel image sensor section 33CH2 composed of the third and fourth CCD image sensor units 33c and 33d, and a third channel image sensor section 33CH3 composed of the fifth CCD image sensor unit 33e. The respective channel image sensor sections 33CH1 to 33CH3 are simultaneously operated in parallel to each other to read the image of the manuscript. Namely, the CCD image sensor device 33 scans from one end to the other end of each of the respective channel image sensor sections, i.e., from the lower end to the upper end in FIG. 5 to read the image of the manuscript in the main scanning direction 86. The reading operation can be performed by such a parallel reading operation at a high speed in the main scanning direction 86. The CCD image sensor device 33 reads the image of the manuscript by optically scanning each of the manuscripts 72 and 79 from the lower end to the upper end in the main scanning direction 86.

The image reading section 30 reads the image of the manuscript in detail as follows by the scanning of the CCD image sensor device 33 in the main scanning direction 86 while the image reading section 30 is moved in the secondary scanning direction 87. With respect to the fixed manuscript 72, the image reading section 30 is moved from the starting position 88 for reading the image of the fixed manuscript in the secondary scanning direction 87, and the image of the fixed manuscript 72 is read along a first even line S1e most close to the fixed image manuscript reading starting point 88 from a starting point a thereof to a terminal point z in the main scanning direction 86. After the reading operation of the fixed manuscript 72, the image reading section 30 is moved by a reading width to be read, and the reading operation is performed along the next odd line S1o, and is thereafter performed along the next even line S2e. Thus, the reading operation is performed from the right end 72R of the fixed manuscript 72 close to the fixed manuscript reading starting point 88 to the left end 72L line by line sequentially.

Similarly, with respect to the moved manuscript 79, when the moved manuscript 79 is transferred in the secondary scanning direction 83, the CCD image sensor device 33 of the image reading section 30 is stopped in the moved manuscript reading position 89 and performs the reading operation along a plurality of reading lines on the moved manuscript 79, i.e., a first even line M1e, the next odd line M1o and the further next even line M2e from starting point a to terminal z in the main scanning direction 86. Thus, the reading operation of the moved manuscript 79 is performed from the left end 79L of the moved manuscript 79 close to the moved manuscript reading position 89 to the right end 79R line by line sequentially.

Figure 6:
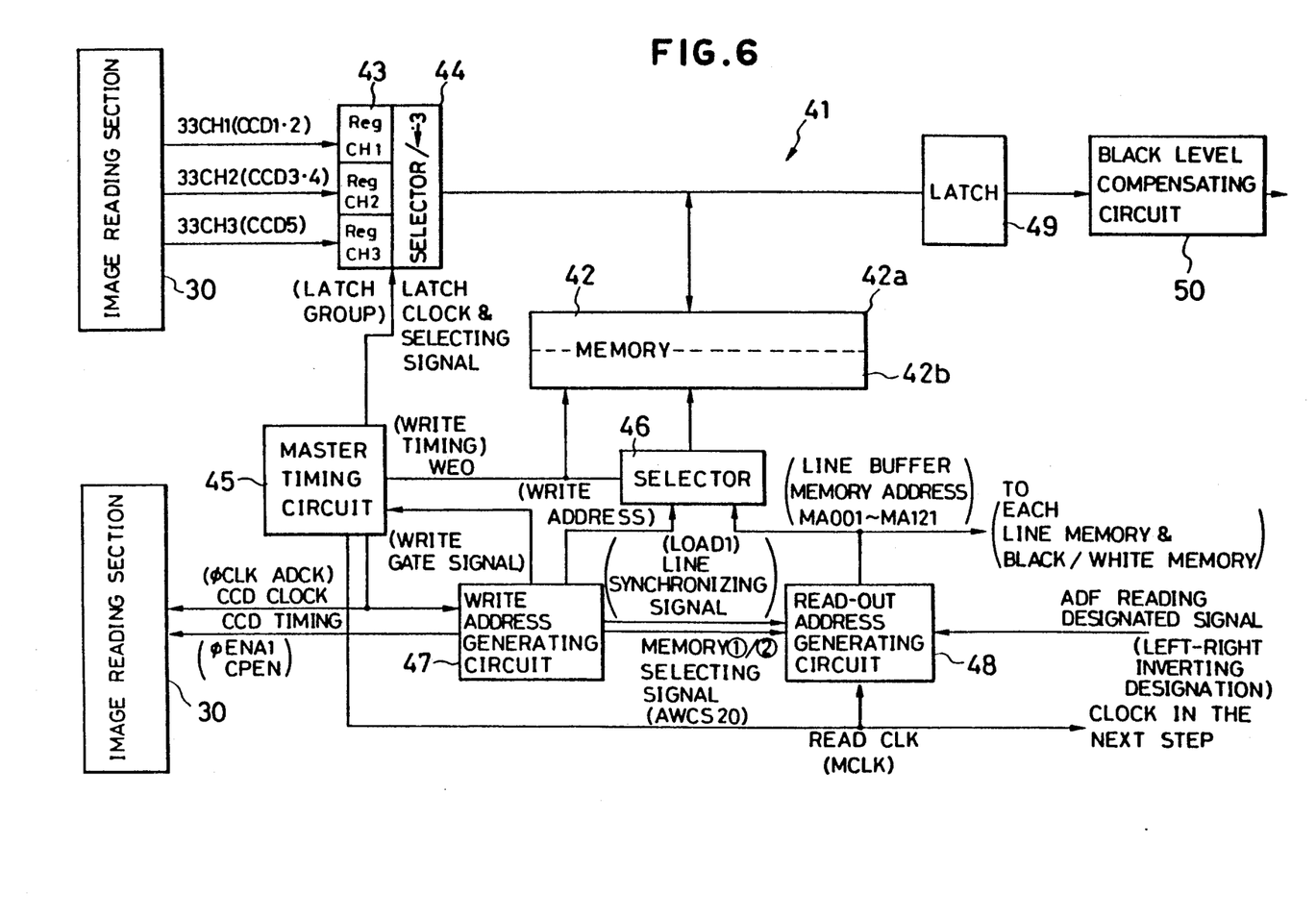
FIG. 6 is a view showing the construction of a rearranging circuit constituting a main portion of the image reading apparatus in accordance with one embodiment of the present invention.

Image signals of the read manuscripts 72 and 79 are supplied to a rearranging circuit 41 of FIG. 6 disposed in the control circuit 40 from the pre-processing circuit 37 of the image reading operation 30.

The rearranging circuit 41 of FIG. 6 will now be described.

The image reading apparatus performs both the fixed manuscript reading operation and the ADF reading operation, and the move manuscript supplying tray 77 is disposed on the opposite side of the platen cover 71 for the fixed manuscript 72 with respect to the platen roller 75, which is different from the conventional moved manuscript supplying tray 77 for the moved manuscript 79. The transferring direction 83 of the moved manuscript 79 is set to be the secondary scanning direction 87 of the fixed manuscript 72. Such constructions cause the image of the moved manuscript to be inverted in the main scanning direction of the ADF read image. The rearranging circuit 41 is a circuit for preventing the image of the moved manuscript to be inverted in the main scanning direction of the ADF read image, and constitutes an image information inverting means.

Namely, as shown in FIG. 5, when the image data of the fixed manuscript 72 sequentially read line by line from the right side 72R to the left side 72L in the main scanning direction 86, and the image data of the moved manuscript 79 sequentially read line by line from the left end 79L to the right end 79R in the main scanning direction 86 are reproduced through the common control circuit 40 which is an image processing circuit, one of the images, the image of the moved manuscript 79, for example, is inverted with respect to the other image of the fixed manuscript 72 in the main scanning direction 86.

The rearranging circuit 41 is disposed to prevent such inversion of the image of the moved manuscript 79. The rearranging circuit 41 temporarily memorizes the image data read by the image reading section 30 into an image memory 42, and reads out the image data of the moved manuscript 79 memorized in the image memory 42 in the reverse direction, i.e., the direction opposite to the main scanning direction 86. In this reverse read-out operation, a read-out address is generated in the reverse direction from a read-out address generating circuit 48 of the rearranging circuit 41, and the read-out address in the reverse direction is supplied to the image memory 42 through a selector 46 from the read-out address generating circuit 48. Thus, the image data of the moved manuscript 79 read from the image memory 42 are inverted to normal image data which are the same as the image data with respect to the fixed manuscript 72.

The rearranging circuit 41 also temporarily memorizes the normal image data of the fixed manuscript 72 in the image memory 42, but, in this case, supplies a normal read-out address which is not inverted from the read-out address generating circuit 48.

With respect to the other construction of the rearranging circuit 41, the rearranging circuit 41 temporarily latches by a latch section 43 three channel parallel image data read by the three channel CCD image sensor units 33CH1 to 33CH3(CCD 1, 2; CCD 3, 4; CCD 5) of the CCD image sensor device 33 of the image reading section 30. Then, the rearranging circuit 41 converts the image data to series image data by a 3-1 selector 44, and memorizes them in the image memory 42 from the selector 44 by a selecting signal and a write timing signal outputted from a master timing circuit 45, a write gate signal and a write address signal outputted from a write address generating circuit 47.

The image memory 42 is divided into an image memory 42a for even line and an image memory 42b for odd line so as to divide and memorize the image data read in the main scanning direction 86 alternately on even and odd lines as described before. The writing operation of the image data to the image memory 42 is the same with respect to both the fixed and moved manuscripts 72 and 79.

Figure 7:
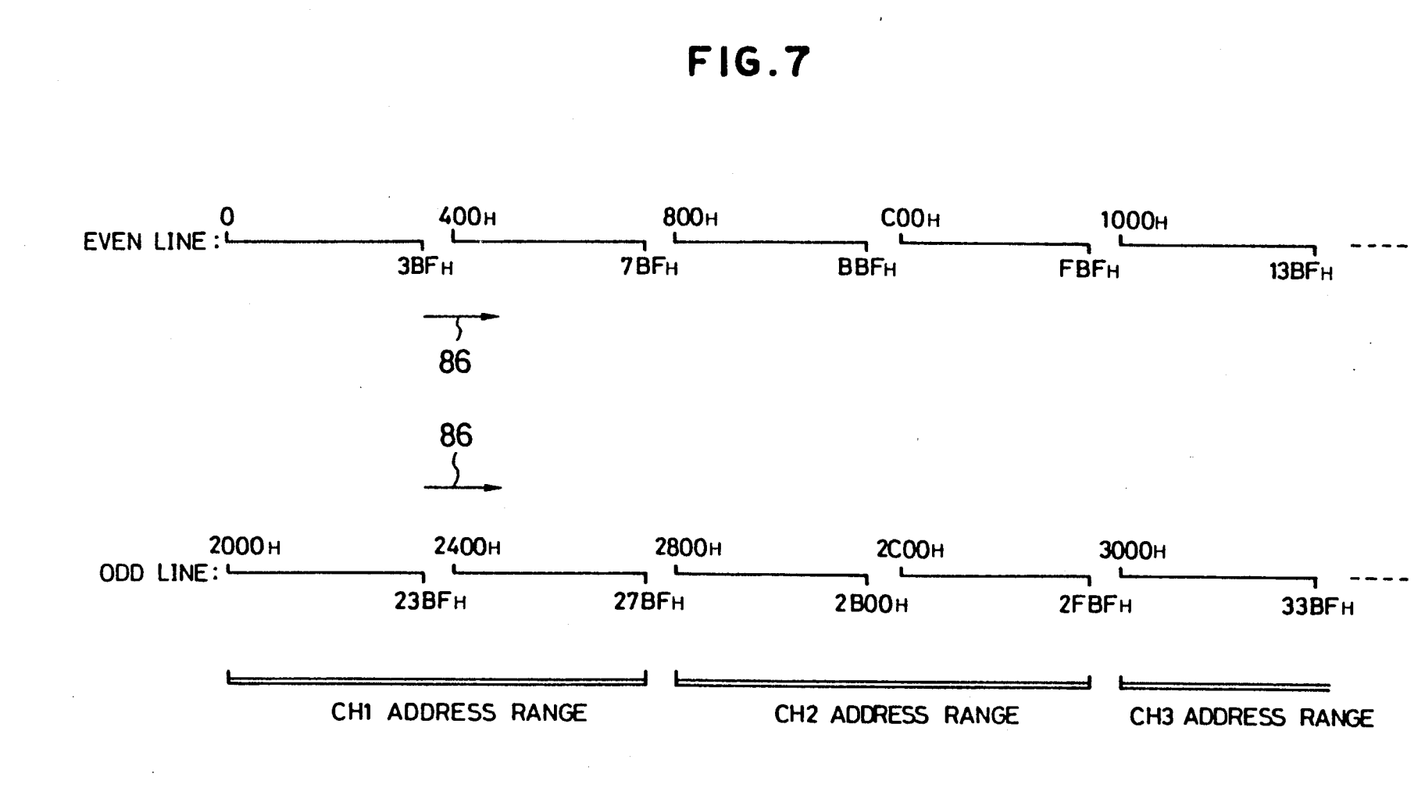
FIG. 7 is a view for explaining a writing address in the image reading apparatus of FIG. 2.

FIG. 7 shows write addresses generated from the write address generating circuit 47 to memorize the even line image data read on the even line and the odd line image data read on the odd line to the even line image memory 42a and the odd line image memory 42b, respectively.

As shown in FIG. 7, the write addresses with respect to the even line image data are denoted by the ones shown by hexadecimal numbers from address 0 through 0-3BF, 400-7BF, 800-BBF, C00-FBF to 1000-13BF. The write addresses with respect to the odd line image data are denoted by the ones shown by hexadecimal numbers from address 2000 through 2000-23BF, 2400-27BF, 2800-2BBF, 2C00-2FBF to 3000-33BF. With respect to these divided addresses, the three channels CH1, CH2 and CH3 of the CCD image sensor device 33 read the images of the corresponding addresses in parallel as shown in FIG. 7 and described in FIG. 5. In this case, the write addresses for the even and odd lines are outputted in a sequential order from a small number to a large number in the main scanning direction of arrow 86, and the even and odd line addresses are alternately generated so that the image of the manuscript is read in synchronization with the generation of the addresses. In this case, the image is read from a direction corresponding to the normal direction having small addresses, which is the same direction as the main scanning direction of arrow 86. Namely, the write addresses are generated in a sequential order from a small number from the write address generating circuit 47 in synchronization with the reading operation.

In FIG. 6, the read-out address generating circuit 48 receives an ADF read designating signal showing ADF reading mode, i.e., an inversion designating signal from the control circuit 40. When the ADF read designating signal is supplied to the read-out address generating circuit 48, the read-out address generating circuit 48 outputs the above-mentioned read-out addresses in the reverse direction supplied to the image memory 42 through the selector 46 so that the image data written in the image memory 42 are read out by the read-out address generating circuit 48 in the reverse direction. When the ADF read designating signal is not supplied to the read-out address generating circuit 48, the read-out address generating circuit 48 outputs normal read-out addresses in the same direction as the write addresses shown in FIG. 7.

Figure 8A:
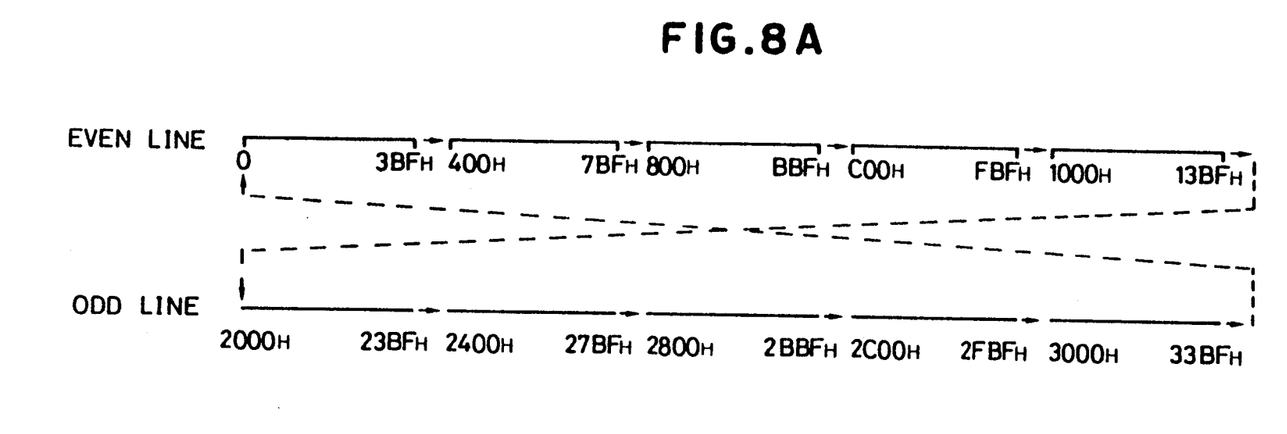
FIG. 8A and 8B are views for explaining read-out addresses of the reading apparatus of FIG. 2.
Figure 8B:
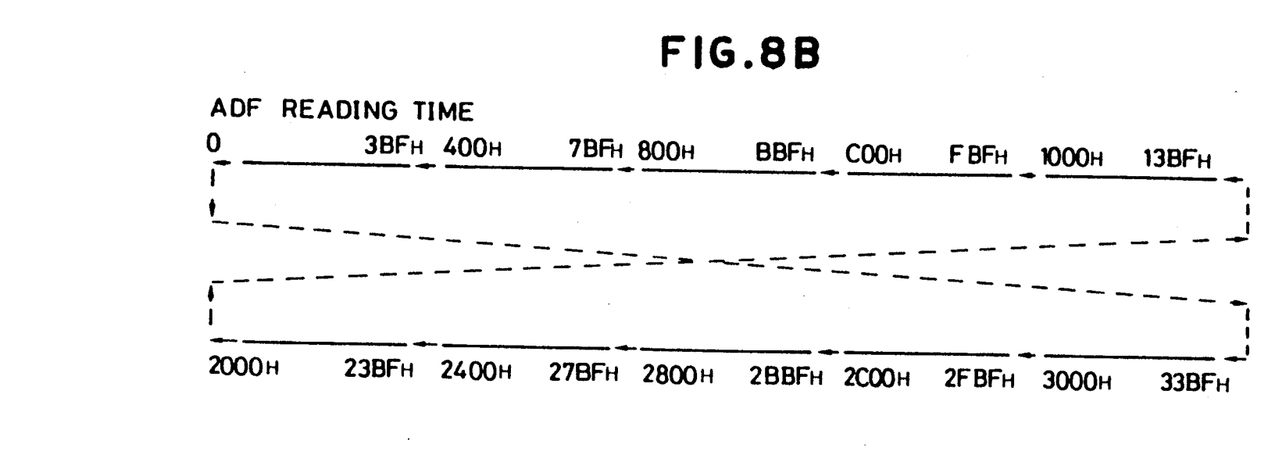

FIGS. 8A and 8B are views for showing the normal read-out addresses for the fixed manuscript and the reversed read-out addresses for the moved manuscript outputted from the read-out address generating circuit 48.

With respect to the normal read-out addresses for the fixed manuscript shown by FIG. 8A, as well as the write addresses, the addresses on the even lines are outputted in a sequential order of 0-3BF, 400-7BF, 800-BBF, C00-FBF and 1000-13BF, and the addresses on the odd lines are outputted in a sequential order of 2000-23BF, 2400-27BF, 2800-2B00, 2C00-2FBF and 3000-33BF. As shown by the arrows and described before, the addresses on the even and odd lines are alternately outputted. With respect to the reversed read addresses for the moved manuscript shown in FIG. 8B, in contrast to the write addresses, the addresses on the even lines are outputted in a sequential order from 13BF to 3BF-1000, FBF-C00, BBF-800, 7BF-400 and 3BF-0, and the addresses on the odd lines are outputted in a sequential order from 33BF to 33BF-3000, 2FBF-2C00, 2BBF-2800, 7BF-2400 and 23BF-2000. The addresses on the even and odd lines are alternately outputted.

When the image of the manuscript is read, the reading operation in the main scanning direction is divided into the ones on the even and odd lines so that, while the image reading operation is performed on the even lines, the read data are memorized in the image memory 42a for the even lines, thereby performing the reading and writing operations of the even line image, and the image data on the odd lines are read from the image memory 42b for the odd lines during the reading and writing operations of the even line image, thereby performing the read-out operation of the odd line image. Further, in contrast, while the reading operation of the odd line image .is performed, the read data are memorized in the odd line image memory 42b, thereby performing the reading and writing operations of the odd line image, and the image data on the even lines are read from the even line image memory 42a during the reading and writing operations of the odd line image, thereby performing the read-out operation of the even line image.

By the above writing and read-out control operations, the efficiency and safety of the write and read-out operations can be improved such that the read-out operation is not performed before the writing operation, for example.

The read-out address generating circuit 48 receives a line synchronizing signal from the write address generating circuit 47, a memory selecting signal for synchronizing and selecting the image memory 42, etc., and outputs addresses to respective line memories and black and white memories, etc. A master timing circuit 45 outputs a CCD clock signal to the write address generating circuit 47 and the image reading section 30. Further, a CCD timing signal is supplied from the write address generating circuit 47 to the image reading section 30.

The image data read from the image memory 42 based on the address control of the read-out address generating circuit 48 are latched by the latch section 49, and are supplied to the black level compensating circuit 50 of the control circuit 40.

The construction of the image reading section 30 and the control circuit 40 will next be described with reference to FIG. 9.

Figure 9:
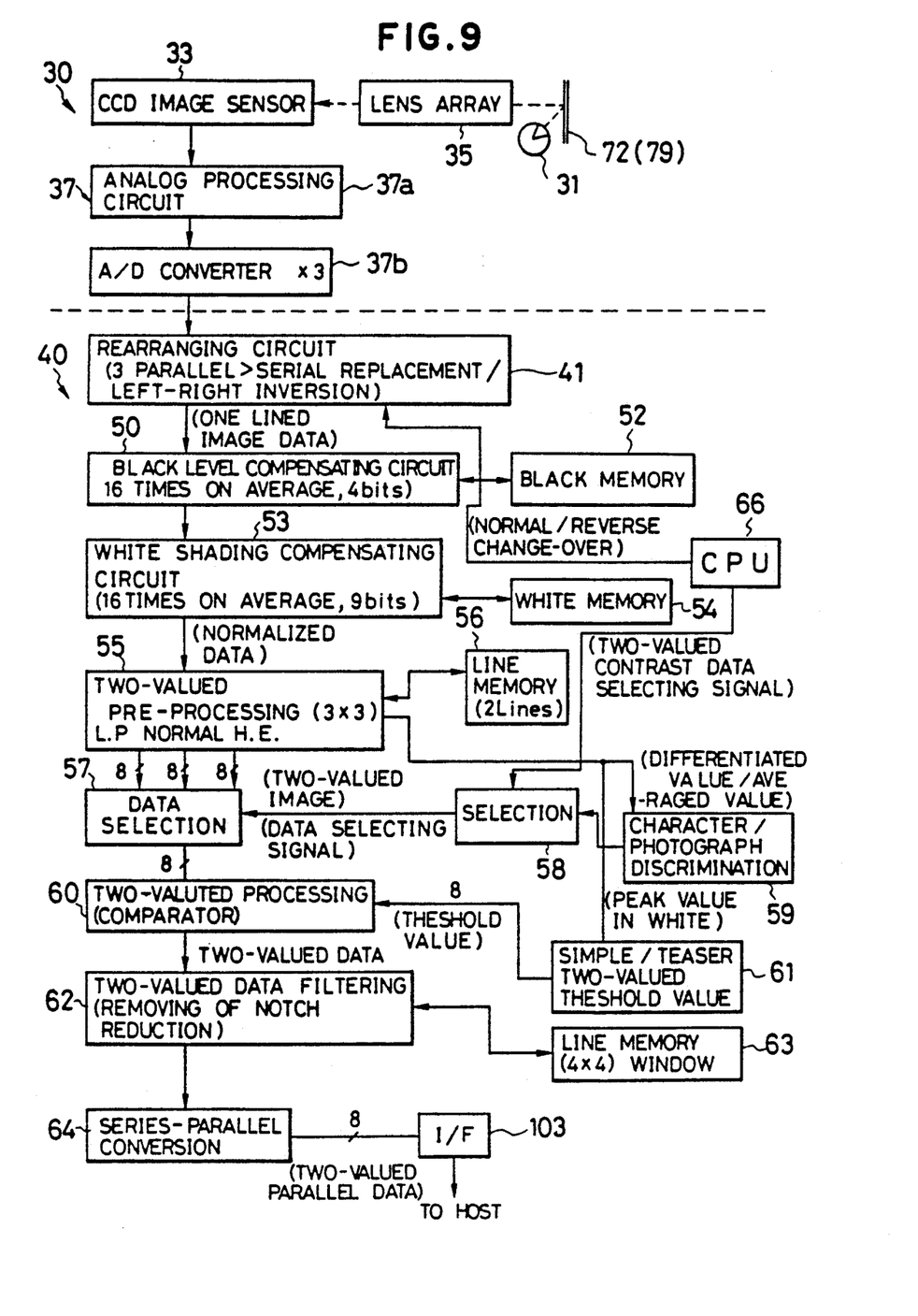
FIG. 9 is a block view of a control circuit of the image reading apparatus of FIG. 2.

In FIG. 9, the image reading section 30 forms an image of each of the manuscripts 72 and 79 illuminated by the fluorescent lamp 31 on the CCD image sensor device 33 through the small lens array 35. The CCD image sensor device 33 detects the image of the manuscripts 72 and 79, and converts it to an electrical signal and supplies the electrical signal to a pre-processing circuit 37. The pre-processing circuit 37 is constituted by an analog processing circuit 37a and an A/D converter 37b, and clamps and amplifies an image signal supplied from the CCD image sensor device 33, and converts it to a digital signal, and supplies the digital signal as image data to the rearranging circuit 41 of the control circuit 40.

The image data supplied from the image reading section 30 to the control circuit 40 are first supplied to the rearranging circuit 41, thereby performing the parallel-series conversion mentioned above and the reversed read-out operation of the image data with respect to the moved manuscript. Thereafter, various image processings of the image data outputted from the rearranging circuit 41 are performed through the black level compensating circuit 50, a white shading compensating circuit 53, a two valued pre-processing circuit 55, and a data selecting circuit 57. Then, the image data are converted into two-valued data in a two-valued circuit 60, and further notch is removed from the image data and the size of the image data is reduced in a filter circuit 62. The image data are further converted to parallel image data by the series-parallel converting circuit 64, and are supplied to a host apparatus through a host interface 103.

In the control circuit 40, a black memory 52 is connected to the black level compensating circuit 50, and a white memory 54 is connected to the white shading compensating circuit 53. The two-valued pre-processing circuit 55 is connected to a line memory 56, a character/photograph discriminating circuit 59, and a simple/teaser two-valued threshold value circuit 61. The data selecting circuit 57 is connected to the character/photograph discriminating circuit 59 through a selector 58. The two-valued circuit 60 is connected to the simple/teaser two-valued threshold value circuit 61, and the filter circuit 62 is connected to a line memory 63.

The whole operation of the control circuit 40 is controlled by a CPU 66.

The image data reading apparatus constructed as above is operated as follows.

When the image of the fixed manuscript 72 is read, a fixed manuscript reading mode is set by the operation of the ADF change-over button on the operation panel 101. At this time, the ADF mode display light emitting diode 121 is not turned on.

The fixed manuscript 72 is placed on the manuscript base glass 73 by opening the platen cover 71 upwards, and is pressed by the platen cover 71 from above. After the fixed manuscript 72 has been completely set and it is confirmed that the light emitting diode 117 for displaying the completion of the preparation of the reading operation is turned on, an unillustrated start button is operated so that the reading section 30 begins to read the image of the fixed manuscript 72 from the fixed manuscript reading starting position 88 by the operation of the pulse motor 93 for moving the reading section through the control circuit 40.

In the fixed manuscript reading operation mode, as shown in FIG. 5, the CCD image sensor device 33 of the image section 30 performs the reading operation of the fixed manuscript 72 from the right end 72R thereof first along the even line S1e in the main scanning direction 86, and a read image signal is converted to digital image data in the pre-processing circuit 37, and the digital image data are supplied to the rearranging circuit 41 of the control circuit 40.

The rearranging circuit 41 writes such image data to the even line image memory 42a of the image memory 42 by the control of the master timing circuit 45 and the write address generating circuit 47, as described before. The write addresses of the even line image memory 42a are 0–3BF, 400–7BF, 800–BBF, C00–FBF, and 1000–13BF, as shown in FIG. 7.

When the image on the even line S1e is read and is written in the even line image memory 42a, the reading operation of the image with respect to the next odd line S1O is started, and the read image data are sequentially written in addresses 2000–23BF, 2400–27BF, 2800–2B00, 2C00–2FBF, and 3000–33BF of the odd line image memory 42b. At the same time when the reading and writing operations on the odd line S1O are performed, the read-out operation of the image data on the even line S1e written in the even line image memory 42a is performed with the normal read-out addresses as shown in FIG. 8A based on the control of the read-out address generating circuit 48. When the reading and writing operations on the odd line S1e has been completed, the reading and writing operations on the next even line S2e are started, and simultaneously the image data on the odd line S1e written in the odd line image memory 42b are read out. Thus, the reading/writing operations and the read-out operation are alternately performed with respect to the even and odd lines until the left end 72L of the fixed manuscript 72.

Various image processings of the image data read from the image memory 42 of the rearranging circuit 41 are performed from the latch section 49, through the black level compensating circuit 50 of the control circuit 40, the white shading compensating circuit 53, the two-valued pre-processing circuit 55, and the data selecting circuit 57, and the image data thus processed are supplied to the two-valued circuit 60. The image data are two-valued by the two-valued circuit 60, and notch, etc., are then removed from the image data by the filter circuit 62. Thereafter, the image data are converted to two-valued parallel image data by the series-parallel converting circuit 64, and are supplied to the host apparatus through the host interface 103.

When the image of the moved manuscript 79 is read, the ADF change-over button 125 on the operation panel 101 is operated to set the moved manuscript reading mode, i.e., ADF mode, thereby turning on the ADF mode display light emitting diode 121. At this time, by the operation of the ADF change-over button 125, the reading section 30 is moved to the ADF reading position 89 by the operation of the pulse motor 93 for moving the reading section by the control circuit 40.

After the moved manuscript 79 has been set on the moved manuscript supplying tray 77 and it is confirmed that the light emitting diode 117 for displaying the completion of the preparation of the reading operation is turned on, the unillustrated starting button is operated so that the image reading section 30 stopped in the ADF reading position 89 actuates respective rollers 81 by the operation of a pulse motor 99 for rotating the rollers 81 by the control of the control circuit 40. Thus, the moved manuscript 79 is transferred on the lower side of the platen roller 75, and the image reading section 30 begins to read the image of the moved manuscript 79 transferred in the ADF reading position 89 from the left side 79L thereof.

In the moved manuscript reading operation mode, as shown in FIG. 5, the CCD image sensor device 33 of the image reading section 30 performs the reading operation in the main scanning direction 86 first along even line M1e from the left end 79L of the moved manuscript 79, and a read image signal is converted to digital image data by the pre-processing circuit 37 and the image data are supplied to the rearranging circuit 41 of the control circuit 40.

The rearranging circuit 41 writes such image data to the even line image data memory 42a of the image memory 42 by the control of the master timing circuit 45 and the write address generating circuit 47 as described before. The write addresses of the even line image memory 42a are 0-3BF, 400-7BF, 800-BBF, C00-FBF, and 1000-13BF, as shown in FIG. 7.

When the image on even line M1e is read and written in the even line image memory 42a, the reading operation is started with respect to the next odd line M10, and the read image data are sequentially written to addresses 2000-23BF, 2400-27BF, 2800-2B00, 2C00-2FBF, and 3000-33BF of the odd line image memory 42b. At the same time when the reading and writing operations on the odd line M1e are performed, the read-out operation of the image data on the even line M1e written in the even line image memory 42a is performed with read-out addresses in the reverse direction as shown in FIG. 8B based on the control of the read-out address generating circuit 48. Namely, in this ADF mode, the image data from the even line image memory 42a are read in the reverse direction from address 13BF to 0 as described in relation to FIG. 8B, inverting the image data to normal image data. When the reading and writing operations on the odd line M1e have been completed, the reading and writing operations are started with respect to the next even line M2e, and simultaneously the image data on the odd line S1e written in the odd line image memory 42b are read out. The image data from the odd line image memory 42b are read out in the reverse direction from address 33BF to 2000 as described in relation to FIG. 8B, inverting the image data to normal image data. While the image data of the moved manuscript are inverted by the reversed read-out operation from the image memory 42, the reading/writing operations and the read-out operation are alternately repeated with respect to the even and odd lines from the left end 79L of the moved manuscript 79 to the right end 79R thereof. Thus, the moved manuscript 79 transferred to the platen roller 75 by the rollers 81 is stacked on the moved manuscript receiving tray 85.

Various image processings of the image data read out of the image memory 42 of the rearranging circuit 41 are performed from the latch section 49, through the black level compensating circuit 50 of the control circuit 40, the white shading compensating circuit 53, the two-valued pre-processing circuit 55, and the data selecting circuit 57, and the image data are then supplied to the two-valued circuit 60. The image data are two-valued in the two-valued circuit 60, and notch, etc., are removed from the image data by the filter circuit 62. Thereafter, the image data are converted to two-valued parallel image data by the series-parallel converting circuit 64, and are supplied to the host apparatus through the host interface 103. In the embodiments mentioned above, the image data are inverted by reading out addresses in the reverse direction from the image memory 42, but the present invention is not limited to this case. For example, the addresses are written in the reverse direction when the image reading data are written in the image memory 42.

Further, in the embodiments mentioned above, although the image data of the moved manuscript are inverted, the image data of the fixed manuscript may be inverted instead of the image data of the moved manuscript. Namely, the image data of either one of the moved and fixed manuscripts may be inverted.

As mentioned above, in the present invention, when the image of a moved manuscript is read, image information are scanned and read by a reading means in a first direction, and are then inverted with respect to the first direction. Accordingly, the moved direction of the reading means with respect to the fixed manuscript and the transferred direction of the moved manuscript are the same direction so that it is not necessary to dispose a moved manuscript supplying tray above a placing section for placing the fixed manuscript thereon. Therefore, when a platen cover for the fixed manuscript is opened, the platen cover does not hit the moved manuscript supplying tray so that the operability and appearance are improved and the cost is also reduced since the moved manuscript receiving tray is also used as a platen cover for the fixed manuscript. Further, the fixed manuscript reading reference position and the ADF reading position can be located to approach each other.

What is claimed is:

1. An image reading apparatus comprising:
   a moved manuscript mounting member for mounting a moved manuscript;
   a first moved manuscript transporting means for transporting the moved manuscript from the moved manuscript mounting member, the first moved manuscript transporting means being positioned at a leading end of the moved manuscript mounting member along a transportation direction of the moved manuscript;
   a second moved manuscript transporting means for transporting the moved manuscript from the first moved manuscript means to a first reading position;

optical reading means for optically reading the moved manuscript in the first reading position, the optical reading means optically reading first subdivided image lines of the moved manuscript, and producing first image data of the moved manuscript and also optically reading second subdivided image lines of the moved manuscript that are alternately arranged with respect to the first subdivided image lines and producing second image data of the moved manuscript;

a fixed manuscript mounting member with a manuscript cover for mounting a fixed manuscript in conjunction with a first surface of the manuscript cover, the manuscript cover being positioned at a delivery side of the moved manuscript in the transportation direction of the moved manuscript;

a second reading position wherein the optical reading means optically reads the fixed manuscript mounted on the fixed manuscript mounting member, the second reading position being located within the delivery side and adjacent the first reading position;

a third moved manuscript transporting means for delivering the moved manuscript from the second moved manuscript transporting means to a second surface of the manuscript cover, the third moved manuscript transporting means being located between the second moved manuscript transporting means and the fixed manuscript mounting member;

memory means for storing, in a predetermined writing address sequence, the first image data and the second image data of the moved manuscript; and data reading means for electronically reading the first image data and the second image data from the memory means, the data reading means electronically reading in a predetermined reading address sequence that is the reverse of the predetermining writing address sequence.

2. An image reading apparatus as claimed in claim 1, wherein the first subdivided image lines are odd-numbered image lines of the moved manuscript, and the second subdivided image lines are even-numbered image lines of the moved manuscript.

3. An image reading apparatus as claimed in claim 1 and 2, wherein after one odd-numbered image line of the moved manuscript has been optically read and the first image data is stored, in the predetermined writing address sequence, into the memory means, one even-numbered image line adjacent to the one odd-numbered image line is read out from the memory means in the predetermined reading address sequence.

4. An image reading apparatus as claimed in claim 1 and 3, wherein the predetermined writing address sequence involves the first image data of the moved manuscript being stored into the memory means in an order from a first odd-numbered image line with a first odd-numbered writing address corresponding to the first odd-numbered image line to a last odd-numbered image line with a last odd-numbered writing address corresponding to the last odd-numbered image line, and the second image data of the moved manuscript being stored into the memory means in an order from a first even-numbered image line with a first even-numbered writing address corresponding to the first even-numbered image line to a last even-numbered image line with a last even-numbered writing address corresponding to the last even-numbered image line.

5. An image reading apparatus as claimed in claim 1 and 3, wherein the predetermined writing address sequence involves the first image data of the moved manuscript being stored into the memory means in an order from a first odd-numbered image line with a last odd-numbered writing address corresponding to a last odd-numbered image line, to a last odd-numbered image line with a first odd-numbered writing address corresponding to the first odd-numbered image line, and the second image data of the moved manuscript being stored in the memory means in an order from a first even-numbered image line with a last even-numbered writing address corresponding to a last even-numbered image line, to a last even-numbered image line with a first even-numbered writing address corresponding to the first even-numbered image line.

6. An image reading apparatus as claimed in claim 1, wherein a home position for the fixed manuscript mounted on the fixed manuscript mounting member is different from a home position of the moved manuscript mounted on the moved manuscript mounting member.

* * * * *